United States Patent
Baudou

(10) Patent No.: US 8,358,254 B2
(45) Date of Patent: Jan. 22, 2013

(54) HELMET COMPRISING VISOR POSITION DETECTION AND ASSOCIATED HELMET POSITION DETECTION

(75) Inventor: Joel Baudou, St Medard en Jalles (FR)

(73) Assignee: Thales, Neuilly sur Seine (FR)

( * ) Notice: Subject to any disclaimer, the term of this patent is extended or adjusted under 35 U.S.C. 154(b) by 309 days.

(21) Appl. No.: 12/757,573

(22) Filed: Apr. 9, 2010

(65) Prior Publication Data

US 2010/0265169 A1    Oct. 21, 2010

(30) Foreign Application Priority Data

Apr. 17, 2009 (FR) ...................................... 09 01869

(51) Int. Cl.
     *G09G 5/00* (2006.01)
(52) U.S. Cl. ............................................. 345/8; 359/630
(58) Field of Classification Search .................. 345/7, 8; 359/630–633; 2/6.3–6.5
See application file for complete search history.

(56) References Cited

U.S. PATENT DOCUMENTS

| | | | |
|---|---|---|---|
| 6,493,147 B1 | 12/2002 | Baudou et al. | |
| 6,715,150 B1 * | 4/2004 | Potin ................................... | 2/15 |
| 2005/0068256 A1 * | 3/2005 | Lin et al. ............................. | 345/8 |
| 2006/0132447 A1 * | 6/2006 | Conrad ........................... | 345/168 |
| 2008/0143639 A1 | 6/2008 | Gerbe et al. | |
| 2009/0125193 A1 * | 5/2009 | Fernandez ........................ | 701/48 |
| 2010/0109976 A1 * | 5/2010 | Gilbert et al. ...................... | 345/8 |

FOREIGN PATENT DOCUMENTS

| | | |
|---|---|---|
| FR | 2723208 A | 2/1996 |
| GB | 2337681 A | 11/1999 |
| WO | 00/63737 A | 10/2000 |

* cited by examiner

*Primary Examiner* — Chanh Nguyen
*Assistant Examiner* — Allison Walthall
(74) *Attorney, Agent, or Firm* — Baker & Hostetler LLP

(57) ABSTRACT

A helmet position detection system for aircraft including a helmet comprising a fixed visor used as an optical mixer and a substantially spherical mobile visor that is able to occupy a position of use and a stowage position, the visor being arranged in front of the pilot's eyes in the position of use. The helmet detects the position of the mobile visor and the helmet position detection system detects an orientation of the helmet corresponding to the pilot's line of sight and applies an angular correction due to the mobile visor to the orientation measurements when the mobile visor is detected in the position of use. Optical sensors are preferably used to detect the position of the mobile visor.

10 Claims, 3 Drawing Sheets

HELMET COMPRISING VISOR POSITION DETECTION AND ASSOCIATED HELMET POSITION DETECTION

CROSS-REFERENCE TO RELATED APPLICATIONS

This application claims priority to foreign French patent application No. FR 09 01869, filed on Apr. 17, 2009, the disclosure of which is hereby incorporated by reference in its entirety.

BACKGROUND OF THE INVENTION

The field of the invention is that of helmet sights and displays. These optical devices are used essentially on aircraft. They comprise an image source and an optical assembly ensuring the collimation and the superposition of the said images on the exterior landscape, the assembly being mounted on the pilot's helmet. The images presented are essentially synthetic images intended for aiding piloting or the designating of objectives. These devices form part of a system which also comprises a device for detecting the posture of the helmet making it possible to servocontrol, for example, the weapons system or the image presented in the helmet display. Initial setup of the image of the helmet sight with respect to the aircraft is carried out by a reference alignment or capture of the posture detection device. This operation is carried out by sighting a reference test pattern in a collimator or a head-up sight previously harmonized with the aircraft's weaponry and navigation system.

The latest-generation helmet sights use the helmet's protection visor as projection and collimation mirror. FIG. 1 represents a simplified view of a helmet sight of this type. An image source represented by the rectangle 3 in this figure generates an image which is collimated towards the pilot's eye by the optics 2 and a part of the visor 1 specifically treated for this purpose. Most helmet sights possess only one visor for reasons of head-borne mass and mechanical simplification. This single visor is in general "missionable", that is to say there exist various tints thereof as a function of the luminous conditions encountered in the course of the mission. In this case, the pilot chooses his visor at the start of the mission and retains it throughout the flight.

This single visor solution is not satisfactory from the operational point of view since it does not allow the use of the helmet sight under all the conditions of the mission in particular when the weather changes or when the flight is performed at the start or at the end of the day.

Helmet sights with two visors correspond better to round-the-clock 24 h/24 mission conditions. The main visor used for image projection is the clear visor for protection against bird strikes or dust and the sun visor is a second visor usable at the pilot's discretion. The visibility of the information presented in the helmet display in fine weather requires an image of high brightness. A sun visor whose uniform transmission is around 15% is used to increase the contrast. The sun visor is placed outside the projection visor so as not to decrease the brightness of the image of the helmet sight and to improve the contrast.

The optical system of a helmet sight such as represented in FIG. 1 is an off-axis system, that is to say the visor 1 is inclined in such a way that the collimation optics 2 and the image source 3 lie outside the visual field of the eye of the user 4 wearing the helmet 5. The visor 1 is in general of spherical form or close to a sphere. This arrangement gives rise to a slight deviation of sighting which increases with the curvature and the thickness of the visor and depends on the refractive index of the material of the visor. FIG. 2 represents an enlargement of the centre of the visor. As seen in this figure, the double refraction of an incident ray 13 corresponding to the line of sight on the two spherical faces 11 and 12 of the visor 1 occurs at slightly different angles of incidence, having regard to the large inclination $\theta$ of the visor 1, causing the shift $\alpha$ of the exterior line of sight. In this figure, the chain-dotted lines represent the normals to the diopters 11 and 12. This deviation is automatically compensated during the image alignment and posture detection during the manufacture of the helmet sight.

The sun visor is in general parallel to the clear visor and exhibits the same type of prismatic deviation. Lowering it therefore gives rise to a shift of the exterior image with respect to the image of the helmet sight, of the order of 5 mrad, that must be compensated through a new alignment with the reference collimator. This operation carried out in flight is tricky and often carried out in a rather imprecise manner because of the movements and vibrations of the aircraft. The prismatic deviation of the sun visor can be cancelled or greatly reduced by making a visor of variable thickness whose external and internal surfaces are determined so as to exhibit surfaces locally parallel to the lines of sight leaving the eye. Such a visor can be made but it exhibits the drawbacks of an additional mass of about 30 grams and of a transmission that is likewise variable with the thickness of the visor therefore in the field, the transmission being about 8% at the bottom of the visor and 15% at the top.

SUMMARY OF THE INVENTION

The device according to the invention does not exhibit these drawbacks. It consists in detecting the presence of the sun visor and in using this item of information in the posture detection system. Thus, the sun visor remains simple to make with a constant transmission in the field, the precision of the line of sight is retained without realignment during the mission. Moreover, it becomes possible to dispense with the reference collimator.

More precisely, the subject of the invention is a helmet position detection system for aircraft including a helmet comprising a substantially spherical mobile visor that is able to occupy a position of use and a stowage position, the visor being arranged in front of the pilot's eyes in the position of use, characterized in that the helmet comprises means for detecting the position of the visor and that the helmet position detection system comprises means making it possible to introduce an angular correction due to the mobile visor in the orientation measurements when the visor is detected in the position of use by the detection means.

Advantageously, the detection means are at least one first optical sensor arranged on the shell of the helmet in such a way that in one of the positions of the visor, this first sensor is under the visor and that in the other position, it is not under the visor. These detection means can also comprise a second sensor arranged on the shell of the helmet. In a first embodiment, this second sensor is not under the visor whatever the position of the latter. In a second embodiment, this second sensor is arranged on the shell of the helmet in such a way that, in one of the positions of the visor, the first sensor is under the visor and the second sensor is not and that, in the other position, the second sensor is under the visor and the first sensor is not.

The detection means can also comprise an electromechanical or electromagnetic detector of the visor's position.

Advantageously, the helmet comprises a helmet display comprising a fixed visor used as optical mixer, the mobile visor being a tinted visor with low optical transmission.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 1:
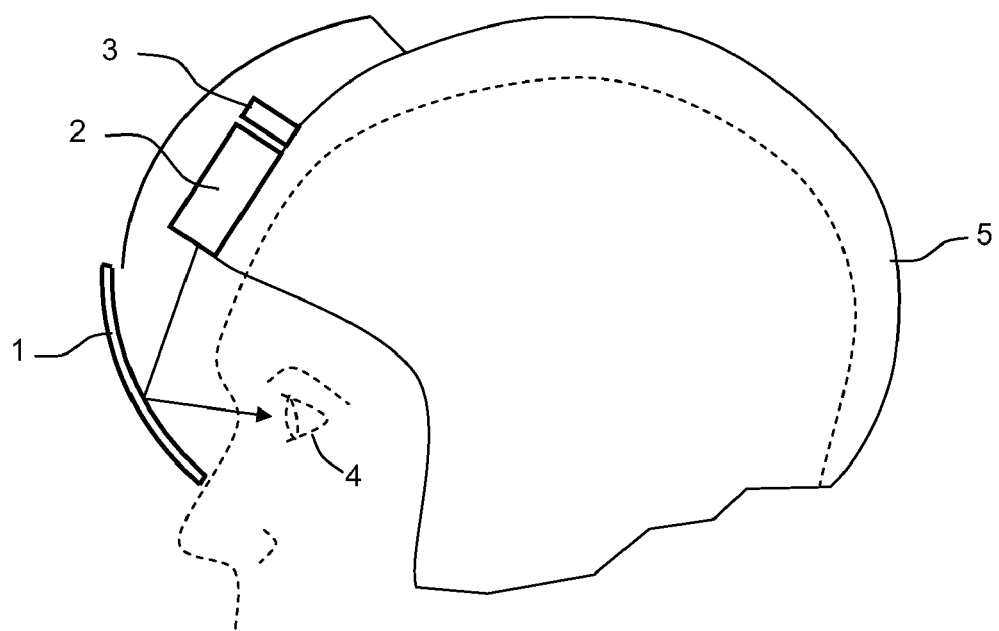
FIG. 1 already commented on represents a helmet display comprising a single visor.
Figure 2:
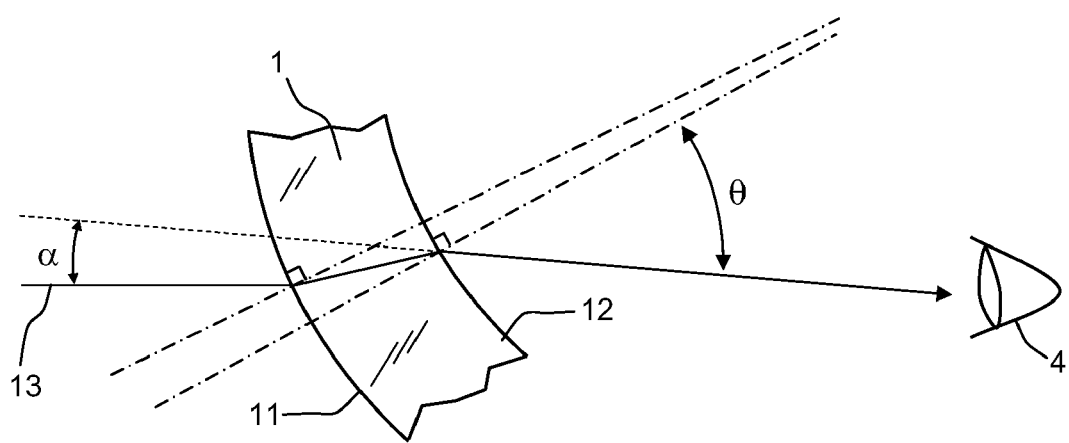
FIG. 2 already commented on represents the refraction of the line of sight by an inclined spherical visor.
Figure 3:
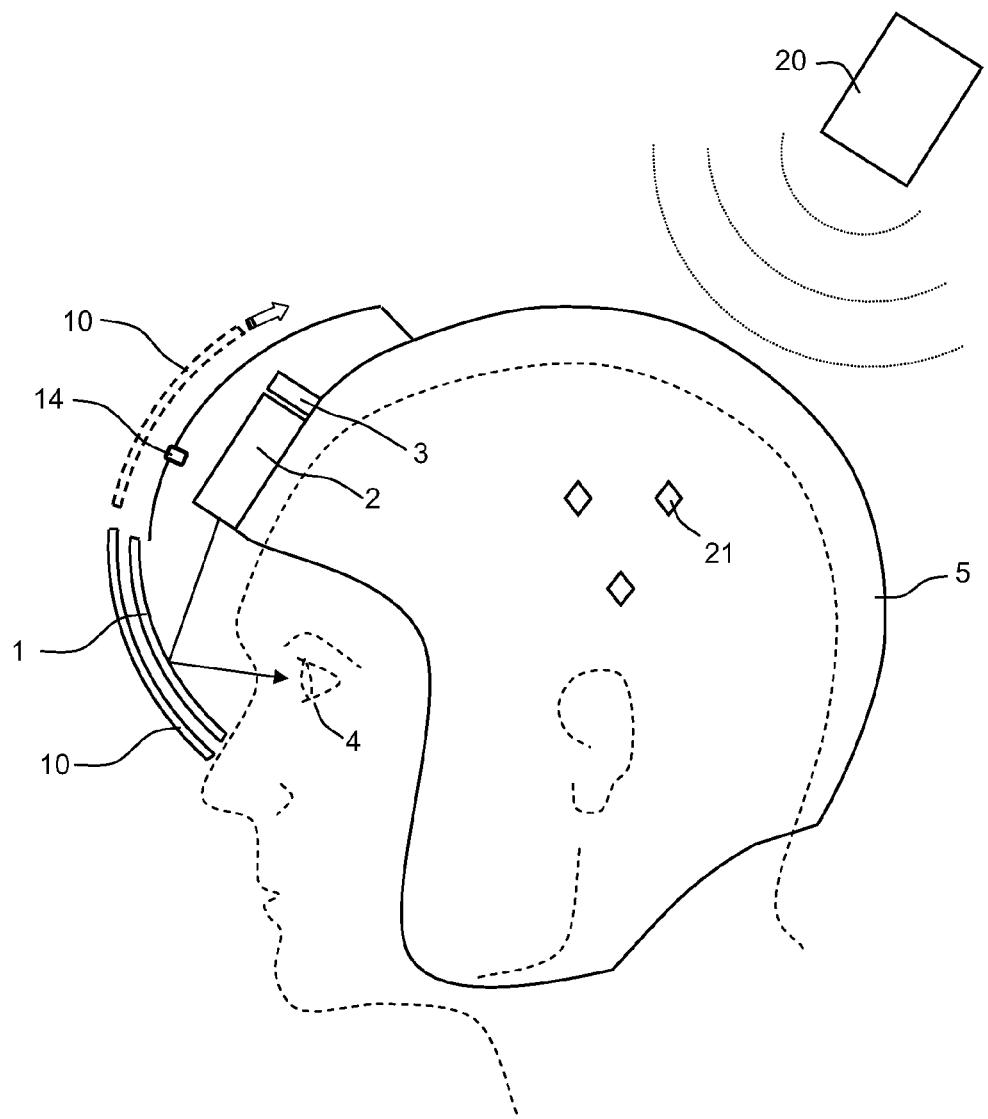
FIG. 3 represents a first exemplary embodiment of a helmet position detection system according to the invention.

By way of first exemplary embodiment, FIG. 3 represents a helmet position detection system according to the invention. This system comprises a helmet 5 worn by a user whose head is represented dashed, helmet position detection comprising a fixed part 20 mounted in the cockpit and whose position and orientation are known perfectly and a mobile part 21 carried by the helmet and symbolized by three lozenges in FIG. 3 whose position or orientation it is sought to determine by means of the fixed part. At least the fixed part is linked to an electronic computer not represented in FIG. 3 which ensures the generation, the shaping and the processing of the signals emitted and received by the fixed and mobile parts so as to provide the information regarding the position or orientation of the mobile part. There exist various types of helmet position detection relying on principles of electromagnetic or optical detection. These systems are well known to the person skilled in the art and have been used on aeroplanes and on helicopters for several years—they are not detailed within the framework of this description. The helmet display 5 comprises the collimation optics 2, the image source 3 and the visor 1 which allows the collimation of the image arising from the source and its superposition on the exterior. By day, this image is essentially a symbology dedicated to piloting, to navigation or to firing. It comprises notably a sighting reticle. At night, it can comprise a synthetic, intensified or infrared image of the exterior landscape. The visor 1 is surmounted by a tinted mobile visor 10 with reduced optical transmission. This visor can take two positions which are on the one hand a bottom position of use and on the other hand a top stowage position. In FIG. 3, the bottom position is represented by solid lines and the top position by dashed lines. The helmet 5 moreover comprises an optical sensor 14 arranged in the vicinity of the mobile visor 10. This sensor is arranged in such a way that a change of visor position can be detected, that is to say for one position of the mobile visor, the sensor is situated under the visor and for the other position, it is situated away from the visor. If the sensor is responsive to the ambient light, when it is situated under the visor, it senses a substantially lower level of energy depending on the transmission of the visor. The response curve of the sensor then records jumps corresponding to the transmission of 15% of the mobile visor. The position of the sun visor is thus easily detected. The sensor can be the photo-electric cell already used for the servocontrol to ambient light of the brightness of the symbology arising from the helmet display. This single cell makes it possible to detect transit of the tinted visor and therefore to trigger the instruction to shift the line of sight in the posture detection. This simple solution exhibits certain drawbacks, however. It does not make it possible to detect whether the sun visor is already lowered when switching the system on. On the other hand, the disposition of the cell under the sun visor when it is lowered does indeed make it possible to detect its presence through the measurement of a low brightness value but with the risk of triggering the instruction on account of low ambient brightness even though the sun visor is raised.

Figure 4:
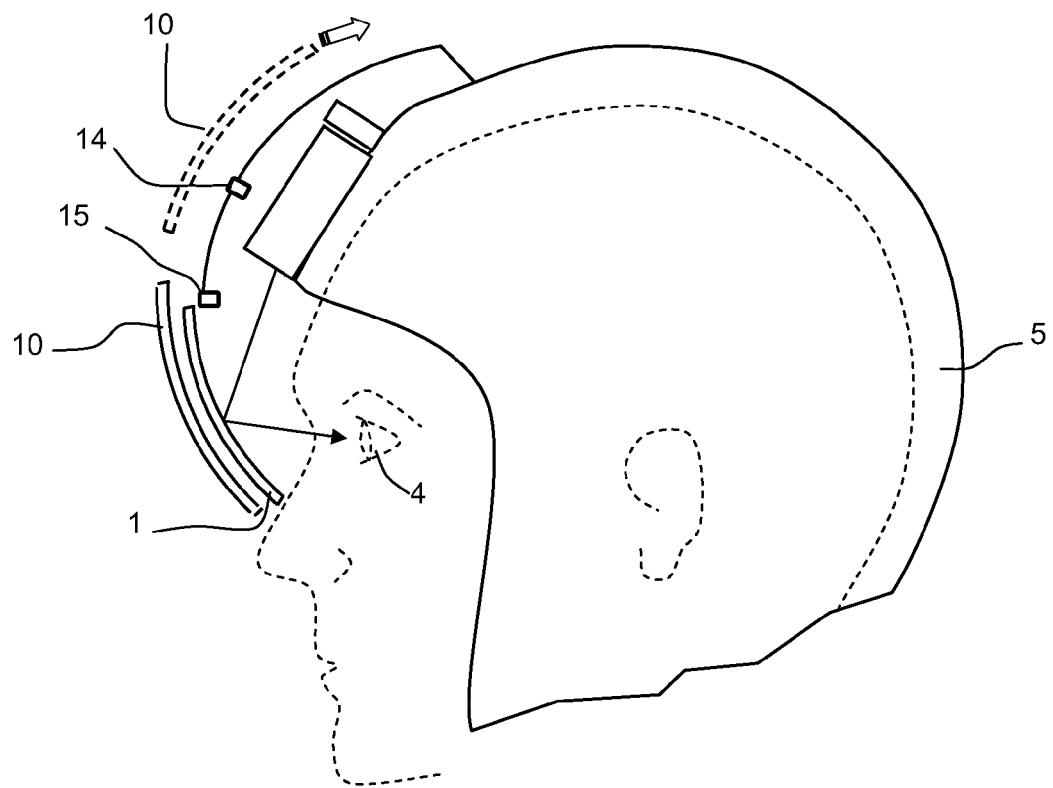
FIG. 4 represents a second exemplary embodiment of a helmet position detection system according to the invention.

Hence, it is preferable to use two optical sensors 14 and 15 as seen in FIG. 4 which represents a second exemplary embodiment of the device according to the invention. In this figure, the same conventions as in FIG. 3 have been adopted. In a first embodiment, the second sensor is still arranged outside of the field of the mobile visor, be it lowered or raised. In this case, this second sensor serves as reference. It is thus possible to determine with certainty the presence of the sun visor through the differential measurement of the signals coming from the two sensors, the differential measurement corresponding to the transmission of the sun visor. In a second embodiment represented in FIG. 4, the first and the second sensor are arranged on the shell of the helmet in such a way that, in one of the positions of the visor, the first sensor is under the visor and the second sensor is not and that, in the other position, the second sensor is under the visor and the first sensor is not. Thus, one of the two signals originating from the sensors is always less than the other whatever the ambient illumination, a change of sign in the difference indicates a change of position of the visor.

The deviation of the line of sight corresponding to the centre of the image field or to the designation reticle is determined by calculation on the basis of the theoretical geometry of the sun visor and then measured after manufacture. The deviation value is recorded in the posture detection calculation program. The instruction to shift the line of sight retrieved by the posture detection system is determined through the information arising from the signals of the sensors when the latter detect the presence of the visor in the user's visual field. It should be noted that this technique makes it possible to obtain a perfect shift of the designation reticle, without having to shift the image. Indeed, it is possible to shift the image of the helmet display so as to compensate the shift introduced by the mobile visor. However, this technique is more unwieldy to implement if perfect compensation of the whole of the image is sought.

In the previous examples, the sensors are optical sensors. These optical sensors can be, for example, photodiodes or photoresistors.

The detection of presence of the sun visor in the visual field can be ensured by other means such as, for example, by a mechanical, optical or magnetic end-of-travel contact placed in proximity to the hinge of the mobile visor.

As was stated, the latest-generation helmet sights use the helmet's protection visor as projection and collimation mirror. Of course, the device according to the invention also applies to helmet sights whose optical mixer is an optical component independent of the protection visor. In this case also, the mobile visor covers the optical mixer in the position of use.

In any event and whatever implementation is adopted, the total mass for the integration of these sensors is less than 5 grams and consequently adds no appreciable extra weight to the helmet.

The invention claimed is:

1. Helmet position detection system for aircraft including a helmet comprising:

a helmet display having a fixed visor used as an optical mixer, the helmet display displaying an image, a substantially spherical mobile visor that is able to occupy a position of use and a stowage position, the mobile visor being arranged in front of a pilot's eyes and adjacent the fixed visor in the position of use, wherein the helmet comprises detection means for detecting the position of the mobile visor, and the helmet position detection system detects an orientation of the helmet corresponding to the pilot's line of sight and applies an angular correction to the orientation of the helmet when the mobile visor is detected in the position of use by the detection means, without shifting the image displayed by the helmet display, and the helmet position detection system does not apply the angular correction to the orientation of the helmet when the mobile visor is detected in the stowage position by the detection means, wherein the angular correction is determined by a deviation in the line of sight when the mobile visor is in the position of use and the angular correction is recorded in the helmet position detection system.

2. Helmet position detection system according to claim 1, wherein the detection means are at least one first optical sensor arranged on the shell of the helmet in such a way that in one of the positions of the mobile visor, this first sensor is under the mobile visor and that in the other position, it is not under the mobile visor.

3. Helmet position detection system according to claim 2, wherein the detection means comprise a second sensor arranged on the shell of the helmet in such a way that this second sensor is not under the mobile visor whatever the position of the latter.

4. A helmet position detection system according to claim 3, wherein the mobile visor is a tinted visor with low optical transmission.

5. Helmet position detection system according to claim 2, wherein the detection means comprise a second sensor arranged on the shell of the helmet in such a way that, in one of the positions of the mobile visor, the first sensor is under the mobile visor and the second sensor is not and that, in the other position, the second sensor is under the mobile visor and the first sensor is not.

6. A helmet position detection system according to claim 5, wherein the mobile visor is a tinted visor with low optical transmission.

7. A helmet position detection system according to claim 2, wherein the mobile visor is a tinted visor with low optical transmission.

8. Helmet position detection system according to claim 1, wherein the detection means comprise an electromechanical or electromagnetic detector of the mobile visor's position.

9. A helmet position detection system according to claim 8, wherein the mobile visor is a tinted visor with low optical transmission.

10. Helmet position detection system according to claim 1, wherein the mobile visor is a tinted visor with low optical transmission.

* * * * *